United States Patent [19]
Lamb

[11] Patent Number: 5,473,209
[45] Date of Patent: Dec. 5, 1995

[54] PERMANENT MAGNET BRAKING SYSTEM FOR DRIVE SHAFTS

[75] Inventor: Karl J. Lamb, Port Angeles, Wash.

[73] Assignee: Magna Force, Inc., Port Angeles, Wash.

[21] Appl. No.: 144,674

[22] Filed: Oct. 29, 1993

Related U.S. Application Data

[63] Continuation-in-part of Ser. No. 65,867, May 21, 1993.
[51] Int. Cl.⁶ .................................................. H02K 49/10
[52] U.S. Cl. ........................ 310/75 D; 310/76; 310/156
[58] Field of Search ............................ 310/75 D, 76, 310/77, 78, 84, 92, 93, 96, 97, 156, 102 A, 90.5

[56] References Cited

U.S. PATENT DOCUMENTS

| | | | |
|---|---|---|---|
| 2,971,105 | 2/1961 | Jaeschke | 310/105 |
| 3,555,321 | 1/1971 | Gruener et al. | 310/93 |
| 3,763,968 | 10/1973 | Noly | 188/171 |
| 3,811,740 | 5/1974 | Sacerdoti et al. | 308/10 |
| 3,822,390 | 7/1974 | Janson | 310/104 |
| 4,152,617 | 5/1979 | Janson | 310/103 |
| 4,826,150 | 5/1989 | Minoura | 272/73 |

Primary Examiner—Steven L. Stephan
Assistant Examiner—D. R. Haszko
Attorney, Agent, or Firm—Seed and Berry

[57] ABSTRACT

A braking system adapted to be used on the drive shaft of a vehicle has a rotor containing permanent magnets mounted on the shaft and preferably has a pair of non-rotary electroconductive plates separated by air gaps from the rotor on opposite sides thereof. The plates are slide mounted in a controlled manner on the vehicle chassis to vary the air gaps between brake-on (relatively narrow gap) and brake-off (relatively wide gap) positions.

14 Claims, 3 Drawing Sheets

PERMANENT MAGNET BRAKING SYSTEM
FOR DRIVE SHAFTS

CROSS-REFERENCE TO RELATED
APPLICATION

This application is a continuation-in-part of my copending U.S. patent application Ser. No. 08/065,867 filed May 21, 1993.

TECHNICAL FIELD

The present invention relates to vehicle auxiliary braking systems and more particularly to the braking of drive shafts as, for example, the drive shaft between a transmission and differential.

BACKGROUND OF THE INVENTION

It has been recognized that there is a need in the operation of heavy duty trucks for increased braking performance and safety, and longer life of the wheel brake linings. In the past coil-type electromagnetic retarders and hydro-dynamic retarders have been used on drive shafts to supplement direct wheel braking. More recently it has been proposed to use strong permanent magnets instead of electromagnets in drive shaft retarders. In these braking devices a drum containing ferrous pole pieces on its inner side is mounted as a rotor on the drive shaft from the engine. A yoke containing a ring of permanent magnets is slide mounted on the track chassis to move coaxially relative to the drive shaft so as to position the magnets opposite the ferrous pole pieces on the drum with a fixed narrow air gap therebetween. The braking torque for a given width of air gap and rotor speed is dependent upon the amount of overlap of the magnets with the pole pieces. When the retarder is in an "off" condition the permanent magnets are moved out of attraction range for the ferrous poles. The drum has external cooling fins to assist in dissipating the substantial heat generated as the brake energy is absorbed generating high ampere eddy currents which are converted to thermal energy heating the drum sometimes to over 600° C.

The described permanent magnet type retarder has been considered to having size and weight advantages over the prior art and to require less chassis modification. However, it does not utilized permanent magnets in the most effective manner for the intended purpose. The present invention aims to provide an improved permanent magnet braking system not involving the attraction of magnets for ferrous poles, but, instead, utilizing the drag (magnetic friction) resulting from relative rotary movement between permanent magnets and an electroconductive pole plate (such as a copper plate) separated by an air gap. It has been found that such an arrangement can take advantage of the superior thermal conductivity of the pole plate for heat dissipation, decrease movement of the magnets for on-off control, and maximize effective use of the magnets.

SUMMARY OF THE INVENTION

Basically the brake of the present invention includes a rotor containing permanent magnets which is mounted on a drive shaft and confronted by a non-rotating electroconductive pole plate preferably made of copper. This plate is slide-mounted to vary the air gap between the rotor and the plate and thereby control the braking torque. When the rotor is rotating eddy currents are created in the plate by intersection of the plate with the magnetic flux emanating from the magnets. As a result the rotational speed of the rotor is retarded and the plate is axially repulsed away from the permanent magnets. The magnitude of the rotary retardation and axial repulsion are dependent upon the rotary speed of the rotor and the width of the air gap; increasing the speed and narrowing the air gap increases the retardation and the repulsion.

Preferably the rotor with the permanent magnets is confronted on both sides by non-rotating electroconductive plates which are slide-mounted to vary the respective air gaps between the rotor and the plates. In this instance the opposite poles of the magnets are directed oppositely toward the electroconductive plates, and adjacent magnets have their poles reversed. When only one electroconductive plate is used, the permanent magnets are preferably arranged so that both poles of each magnet are directed toward the electroconductive plate.

Endwise sliding adjustment of each electroconductive plate to vary the air gap for controlling the rotary retarding of the rotor is small and can be made by controlled operation of one or more pneumatic cylinders connected to the plates and selectively supplied with compressed air. Control may be had, for example, by pressing a foot pedal or operating a hand lever. The plates may be spring-loaded to assume a brake-on position unless the bias of the spring-loading is countered by air pressure applied to shift the plates to a brake-off position.

In the practice of the present invention the generated heat from braking is dispersed over the electroconductive copper plates for superior dissipation to the atmosphere.

Figure 1:
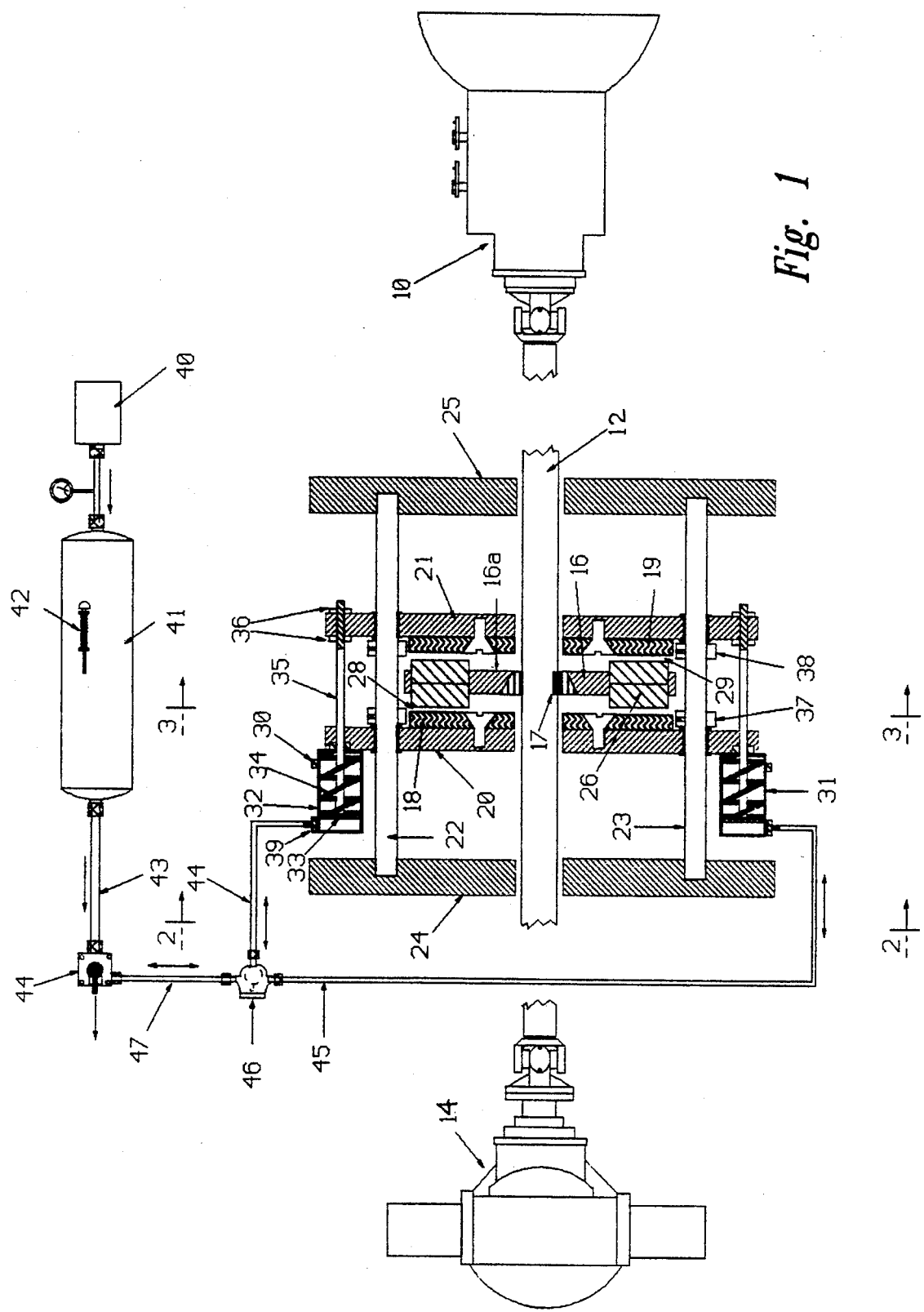
FIG. 1 is a longitudinal vertical sectional view of the braking mechanism in a braking system embodying the present invention.
Figure 2:
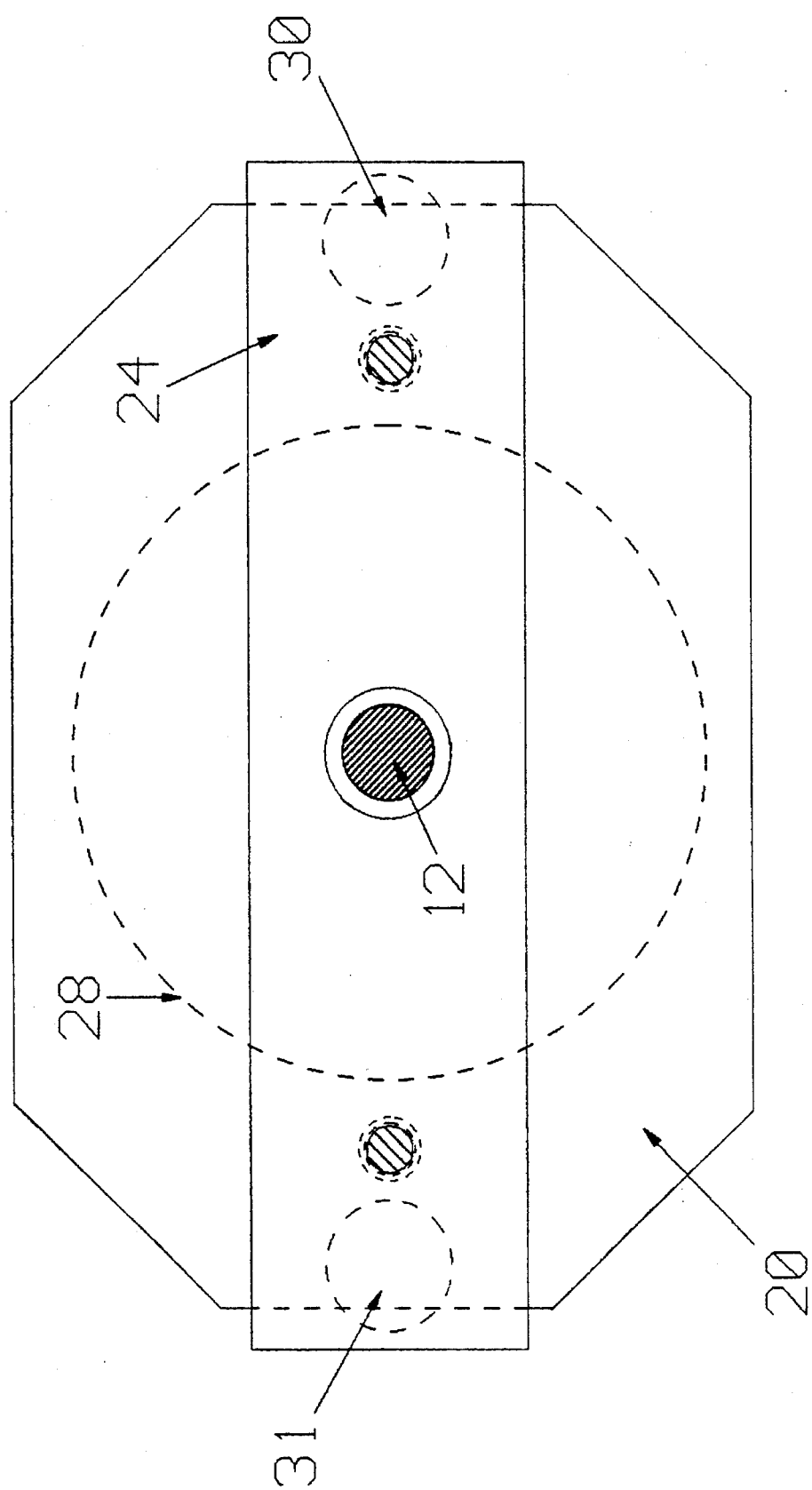
FIG. 2 is a transverse elevational view taken as indicated by line 2—2 in FIG. 1.
Figure 3:
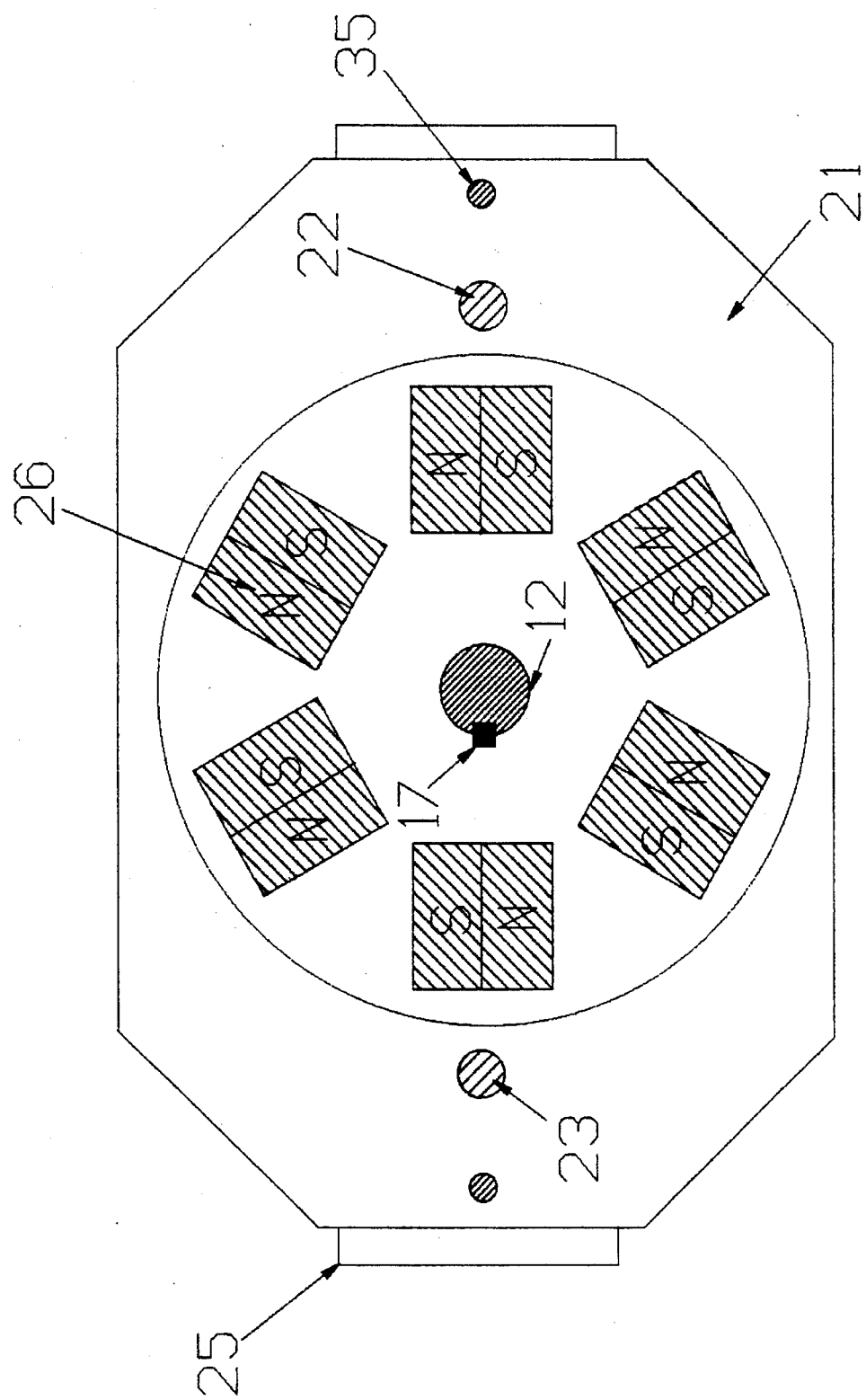
FIG. 3 is a transverse vertical sectional view taken as indicated by line 3—3 in FIG. 1.

DETAILED DESCRIPTION OF THE
INVENTION

Referring to the drawings, a truck chassis has a transmission 10 with a drive shaft 12 extending therefrom to a differential 14 with drive axles extending to driven wheels. When the truck is moving downhill the driven wheels take over and exert a driving torque to the drive shaft which can be countered by the brake of the present invention.

In its preferred form, the brake of this invention comprises a magnetic rotor 16 fixed as by a key 17 on the drive shaft 14 and a pair of axially adjustable electroconductive plates 18-19 confronting opposite sides of the rotor. These plates are screw mounted on parallel slide members 20-21 which are in turn slide mounted by suitable bushings on a pair of guide rods 22-23 extending in parallel relation to the drive shaft 14. Cross-members 24-25 connected to frame rails of the chassis support the ends of the guide rods 22-23. The plates 18-19 are preferably made of copper, and it has been found that multi-layered laminated copper gives superior results.

The magnetic rotor 16 contains permanent magnets 26, preferably of the rare earth type, and namely, the lanthonides such as neodymium iron boron and samarium cobalt. The magnets may be circular or rectangular in cross-section, for example, and are bonded into complementing openings provided in a disc 16a which is preferably non-ferrous and may be of any suitable plastic, ceramic or metal material. The magnets 26 are arranged symmetrically with adjacent magnets arranged so that they present opposite poles on each side of the rotor. The magnets can be arranged in sets, each set comprising two or more magnets stacked end for end, positive pole facing negative pole. For example, as illustrated, there can be twelve sets, each containing two magnets, arranged with two sets in each of six openings in the disc 16a. In such an instance six alternating sets have their poles arranged in N-S-N-S order from one face of the rotor to the other face, whereas the six intermediate sets have their poles arranged in a S-N-S-N order. It is preferred to have the magnets 26 projecting beyond the faces of the disc.

The electroconductive plates 18-19 are separated from the magnetic rotor 16 and its magnets 26 by equal air gaps 28-29. Control of the width of these air gaps is controlled by operation of a pair of air cylinder units 30-31. Each of these units has a cylinder 32 mounted on slide member 20, a piston 33 loaded by a compression spring 34, and a piston rod 35 passing freely through slide member 20 and anchored to slide member 21 by a pair of nuts 36. With this arrangement the springs 34 bias the slide members 20-21 toward one another thereby tending to cause narrowing of the air gaps 28-29. A minimum width for the air gaps 28-29 can be set by stop collars 37-38 on one or both of the guide rods 22-23. This minimum width of the air gaps corresponds to the fully "on" position of the brake.

Release of the brake to an "off" position is performed by applying compressed air to the pistons 33 of the cylinder units 30-31 in opposition to the springs 34 through cylinder ports 39. The compressed air is supplied by an air compressor 40 feeding a reservoir tank 41 having a pressure relief valve 42. A discharge line 43 from the tank 41 leads to a control valve 44 in the vehicle cab which controls supply and discharge of compressed air to and from the cylinder units 30-31 via branch lines 44-45, relay valve 46, and primary line 47. Control valve 44 has a brake-on position in which discharge line 43 is blocked off and primary line 47, branch lines 44-45, and cylinders 32 are exhausted. In this brake-on position the compression springs 34 in the cylinder units 30-31 act to narrow the air gaps 28-29 to their minimum width. Control valve 46 has a brake-off position in which compressed air is supplied to the cylinders 32 from the tank 41 by way of lines 44, 45 and 47 to compress the springs 34 and thereby widen the air gaps 28-29.

When the drive shaft 14 is turning the magnetic flux emanating from the magnets 26, on the rotating rotor 16 is intersected by the electroconductive plates 18-19 and eddy currents are created in the plates. Consequently, the rotational speed of the rotor 16 is retarded. At the same time the plates 18-19 are repulsed away from the rotor 16, but this repulsion is countered by the springs 34. Hence, when the control valve 46 is in its brake-on position, or the supply of compressed air to the control valve 46 is cut off by a mishap when the control valve is in its brake-off position, the brake will retard rotation of the drive shaft 14. When the compressed air supply is intact, movement of the control valve 46 to the brake-off position causes compressed air to be introduced to the cylinder units 30-31 in opposition to the springs 34. As a result the springs 34 are compressed sufficiently for the air gaps 28-29 to be increased (widened) by spreading apart of the slide members 20-21 and attached electroconductive plates 18-19. The air gaps are increased sufficiently that the retarding effect of the relative rotary motion between the electroconductive plates 18-19 and magnetic rotor 16 is eliminated. During operation of the brake the air gaps 28-29 tend to remain equal.

The braking system has been described with a fail-safe control system. it will be appreciated that if a fail-safe feature is not desired the springs 34 can be eliminated and the branch lines 44-45 shifted to the opposite ends of the cylinders 32 from the illustrated position so that applying air pressure to the cylinders will cause the air gaps 28-29 to be narrowed to their minimum width corresponding to a full brake-on position. When the cylinders 32 are then dumped by moving the control valve 46 to the exhaust position, the repulsion between the magnets 26 on the rotor 16 and the electroconductive plates 18-19 when there is relative rotary motion between the rotor 16 and the plates 18-19, causes the rotors to spread apart to a brake-off position. Hence, when the control valve 46 is positioned to apply pressure to the system a brake-on condition exists, and when the control valve is positioned to dump pressure from the system a brake-off condition exists.

The braking system has been described as controlled by a pneumatic control valve in the vehicle cab. It will be appreciated that this control valve can be electrically operated in a control arrangement in which depression of the brake pedal operates a switch causing the control valve to be moved to a brake-on position, and in which pressing of the accelerator operates a switch causing the control valve to be moved to a brake-off position.

Although it is preferred to use two electroconductive plates on opposite sides of the magnetic rotor, it will be appreciated that the system can be operated with a single electroconductive plate with less efficiency. In such a modified system it is preferred that magnets be used having both poles facing the electroconductive plate.

The invention has been described applied to a vehicle drive shaft. However, it is also applicable to braking other drive shafts.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A braking system for a rotary shaft comprising:

a rotor mounted on said shaft;

permanent magnets mounted on said rotor;

fixed guides parallel to said shaft; and a pair of non-rotary electrically conductive members surrounding said shaft on opposite sides of said rotor and axially spaced therefrom by air gaps, said conductive members being slidably mounted on said guides for varying said gaps from a minimum gap dimensions, there being substantially no magnetic attraction between said magnets and said conductive members when said shaft is stationary and said gaps are at said minimum gap dimension.

2. A braking system according to claim 1 including means, engaging said members, for biasing said members toward said rotor.

3. A braking system for a rotary shaft comprising:

a rotor mounted on said shaft and having oppositely directed rotor faces directed along said shaft;

permanent magnets mounted on said rotor, each magnet having respective poles directed oppositely in a same orientation as said rotor faces, adjacent of said magnets having alternate poles;

a pair of electrically conductive non-rotating plates positioned on opposite sides of said rotor and spaced from said rotor by adjustable air gaps, there being a minimum air gap dimension at which there is maximum braking of said shaft;

and adjustment apparatus for selectively moving said plates toward and away from said rotor to vary said air gaps between said magnets and said plates when the drive shaft and rotor are rotating to thereby selectively retard rotation of the shaft, there being substantially no magnetic attraction between said magnets and said electro-conductive plates when said shaft is stationary and said air gaps are at said minimum air gap dimension.

4. A braking system according to claim 3 in which said plates contain copper.

5. A braking system according to claim 3 in which said plates are slide-mounted on fixed guide rods parallel to said shaft.

6. A braking system according to claim 3 in which said adjustment apparatus includes air cylinder units coupled to said plates, and means for selectively charging and exhausting said air cylinder units.

7. A braking system according to claim 3 in which said shaft is mounted on a vehicle chassis between a prime mover and drive wheels, and said plates are slide-mounted on said chassis to be selectively moved axially of said shaft toward or away from said rotor.

8. A braking system for a wheeled vehicle comprising:

a chassis having ground engaging drive wheels, a rotary shaft mounted on said chassis and coupled to said wheels;

a magnetic disc containing equally spaced permanent magnets;

a non-ferrous electro-conductive member separated from said disc, alternating of said magnets having poles of different polarity facing said disc;

said disc and member being mounted on said shaft and on said chassis, respectively, such that there is an adjustable spacing between said magnets and member, and there is relative coaxial rotary motion between said disc and member when said shaft is rotating for optionally providing magnetic retarding of said shaft;

and adjustment apparatus on said chassis for varying a position of said disc and member relative to one another along a rotary axis of said shaft between brake-on and brake-off positions such as to vary a magnitude of said magnetic retarding.

9. A braking system according to claim 8 in which there is substantially no magnetic attraction between said magnets and said electro-conductive member when said shaft is stationary and said disc and electro-conductive member are in said brake-on position.

10. A braking system according to claim 8 in which said disc is fixed on said shaft and said member is mounted on said chassis for movement relative to said disc.

11. A braking system according to claim 8 in which said adjustment apparatus is arranged to vary the position of said disc and member relative to one another endwise of said shaft.

12. A braking system comprising:

a frame;

a rotary shaft mounted on said frame and coupled to a load;

a magnetic disc containing multiple permanent magnets;

a pair of electrically conductive members on opposite sides of said disc;

said disc and pair being mounted, one on said shaft and the other on said frame such that there are adjustable spacings between said magnets and members, and there is relative coaxial rotary motion between said disc and pair when said shaft is rotating for optionally providing magnetic retarding of said shaft relative to said frame;

and adjustment apparatus for varying a position of said disc and members relative to one another between brake-on and brake-off positions such as to vary a magnitude of said magnetic retarding.

13. A braking system according to claim 12 in which said disc is non-ferrous and said permanent magnets are arranged in groups which are equally spaced from one another circumferentially of said disc and are equally spaced from the center of said disc, each of said groups having two side-by-side magnets of rectangular cross-section arranged with one side of each magnet radial of said disc, the two magnets in each group having like poles facing in opposite directions toward said electrically conductive members.

14. A braking system according to claim 8 in which a second non-ferrous electro-conductive member is mounted on said chassis on the opposite side of said disc from the first-mentioned electro-conductive member so that there is an adjustable spacing between said magnets and said second electro-conductive member, said adjustment apparatus also varying the position of said disc and second electro-conductive member relative to one another between said brake-on and brake-off positions.

* * * * *